United States Patent

Puppe et al.

[11] 4,007,253
[45] Feb. 8, 1977

[54] PRODUCTION OF SYNTHETIC ZEOLITE OF FAUJASITE STRUCTURE

[75] Inventors: Lothar Puppe; Günter Ulisch; Friedrich Schwochow, all of Leverkusen, Germany

[73] Assignee: Bayer Aktiengesellschaft, Leverkusen, Germany

[22] Filed: July 25, 1975

[21] Appl. No.: 598,980

[30] Foreign Application Priority Data

Aug. 7, 1974 Germany ............... 2437914

[52] U.S. Cl. .................. 423/329; 423/118
[51] Int. Cl.² ........................... C01B 33/28
[58] Field of Search .......... 423/329, 328, 330, 118; 252/455 Z

[56] References Cited

UNITED STATES PATENTS

| | | | |
|---|---|---|---|
| 2,882,243 | 4/1959 | Milton | 423/328 |
| 2,979,381 | 4/1961 | Gottstine et al. | 423/329 |
| 3,071,434 | 1/1963 | Frilette et al. | 423/329 |
| 3,119,659 | 1/1964 | Taggart et al. | 423/118 |
| 3,321,272 | 5/1967 | Kerr | 423/329 |
| 3,685,963 | 8/1972 | Schwochow et al. | 423/329 |

Primary Examiner—Edward J. Meros
Attorney, Agent, or Firm—Burgess, Dinklage & Sprung

[57] ABSTRACT

A process for the production of synthetic zeolite with the crystal structure of faujasite and with a composition corresponding to the formula:

$$Na_2O \cdot Al_2O_3 \cdot (2.5 \pm 0.5) SiO_2 \cdot n\ H_2O$$

($n = 0$ to 8)

comprising forming a reaction mixture containing $Na_2O$, $Al_2O_3$, $SiO_2$ and $H_2O$ at a temperature of about 60° to 105° C in the presence of about 1 to 20% of finely divided zeolite A based on the weight of $Na_2O + Al_2O_3 + SiO_2$, thereby to form a precipitate which crystallizes to form a synthetic zeolite of faujasite structure. Advantageously the molar ratios of the oxides in the reaction mixture, exclusive of the added zeolite A, are approximately:

$SiO_2/Al_2O_3 = 3$ to 5

$Na_2O/SiO_2 = 1.2$ to 1.5

$H_2O/Na_2O = 35$ to 45.

Even if the mass is stirred during crystallization, little or no phillipsite is produced.

5 Claims, No Drawings

PRODUCTION OF SYNTHETIC ZEOLITE OF FAUJASITE STRUCTURE

This invention relates to an improved process for the production of synthetic zeolites with faujasite structure.

Faujasite occurs naturally as a relatively rare zeolytic mineral and was first described in 1842 by Damour (Ann. d. Mines (1842) 395). An exact structural analysis was made by Bergerhoff (Min. Monatsh. 1958, 193).

The synthetic zeolites of faujasite structure produced by the process according to the invention have pore diameters of from about 7 to 10 A and belong to the so-called wide-pored molecular sieves. In the literature, synthetic faujasites are known by such names as Z 14 Na, Z 14 HS, zeolite X, zeolite Y, zeolite 13 X, zeolite 10 X, etc. The differences between these individual types and the natural faujasites lie primarily in the $SiO_2 : Al_2O_3$ ratio and in the type and quantity of cations present.

In general, synthetic faujasites are initially produced in the sodium form. Their chemical composition may be described by the general formula:

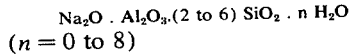

($n = 0$ to 8)

In accordance with their nature as cation exchangers, however, various other cations, such as for example $Li^+$, $K^+$, $Mg^{2+}$, $Ca^{2+}$, $Sr^{2+}$, $Ba^{2+}$, $Cd^{2+}$, $Ce^{3+}$, $Ag^+$, $Zn^{2+}$, $Mn^{2+}$, $Co^+$ and $Ni^{2+}$, may be introduced in varying quantities into the lattice instead of the sodium.

The general principle for producing synthetic zeolites has been known for some considerable time (Kurnakow, Journal of the Academy of Sciences of the USSR (1937), 1381). According to this general principle, aqueous sodium aluminate and sodium silicate solutions are combined and the resulting sodium aluminosilicate gel is subsequently subjected to hydrothermal crystallization. Because of the large number of zeolites which can be obtained in the present 4-component system, $Na_2O$—$Al_2O_3$—$SiO_2$—$H_2O$, it is necessary in order to obtain a certain lattice type in pure form, to work under strictly defined conditions. Thus, in the synthesis of the highly porous faujasite structure, the type of $SiO_2$ used, the quantitative ratios between all the starting components, the temperature and the reaction time, are all critical parameters which have to be carefully adapted to one another in order to obtain useful results.

In addition, it has been found that another critical parameter is whether or not the reaction mixtures are stirred during gel precipitation, during heating to the crystallization temperature and during crystallization itself. Stirring, especially at low speeds, is accompanied by the gradual formation of an undesirable zeolite which has narrow pore openings and only limited adsorption capacity, with the result that it is not suitable for use on a commercial scale.

Because of the close structural relationship between this lattice and the naturally occurring mineral phillipsite, this secondary product is briefly referred to hereinafter as "phillipsite" in the interests of simplicity.

In the commercial production of molecular sieve faujasites, as opposed to the production of relatively small quantities on a laboratory scale, it is extremely difficult to carry out synthesis without continuous, mechanical stirring. With increasing apparatus dimensions, it becomes increasingly more problematical to heat the reaction mixtures and subsequently to keep the crystallization temperature at a constant level without stirring the synthesis mixture because of the poor transfer of heat from the relatively small heat-exchange surface to the stationary suspension. These difficulties have resulted in the development of special processes for synthesizing faujasite on a commercial scale, in which the reaction mixtures prepared in known manner can be crystallized even with stirring.

According to German Patent Specification No. 1,138,383 for example, the reaction mixture is subjected before actual crystallization to a so-called ripening or ageing process to reduce its sensitivity to stirring during heating. The gel ripening stage is said to take between 2 hours and 9 days. It is apparent both from the Examples and from the detailed description of the process that, in general, the required effect of the pretreatment stage is only obtained after periods of more than 12 hours.

Another process for improving the economy of faujasite synthesis is the so-called hot precipitation process. The commercially available hot starting solutions are not initially cooled to ambient temperature for precipitating the sodium aluminosilicate gel from the sodium silicate and sodium aluminate solutions employed for this purpose, but instead are used at the temperature required for crystallization.

In the process described in German Patent Specification No. 1,038,015, two preheated (100° C) reactant solutions of equal volume, one of which contains sodium silicate and the other sodium aluminate and sodium hydroxide, are first quickly mixed in a mixing pump and the mixture obtained is subsequently discharged into a preheated digestion vessel, in which crystallization is carried out for at least 6 hours at 100° C in the absence of further mechanical stirring.

These so-called hot-mixing processes are distinguished by the particular sensitivity of the gels to stirring during hydrothermal crystallization. Even the movement involved in transferring the reaction mixtures through pipes to the processing equipment is sufficient to form considerable quantities of undesirable crystalline impurities.

Another process for the hot precipitation of zeolites with faujasite structure is described in German Patent Specification No. 1,291,325. In that process, at least one reactant is mixed with seed crystals prepared in advance before being mixed with the other reactants. The faujasite-type seed crystals used are prepared by terminating crystallization from the corresponding reaction mixture before the point in time at which crystals with different crystal structures and different molar compositions crystallize out, preferably before more than 30% of the reaction mixture is crystallized.

According to the embodiment described in the abovementioned Patent Specification, the reactants, at least one of which is saturated with seed crystals, have to be combined while stirring at 100° C over a period of 5 seconds or less. The amorphous gel precipitated is left standing at 100° C for at least 3 hours without stirring or any other form of mechanical agitation in order to obtain crystalline zeolite of faujasite structure. If the reactants are combined over a period of longer than 5 seconds, considerable quantities of impurities of zeolites with undesirable structures are formed. Standard commercial-grade waterglass solutions cannot be used as an inexpensive silicate source for this hot-precipitation process for producing zeolites of faujasite structure, because the faujasite is only formed with a special sodium silicate with a definite molecular composition.

The present invention overcomes the disadvantage of conventional processes as discussed above, and relates to a process for the production of synthetic zeolites with the crystal structure of faujasite and with a composition corresponding to the general formula:

$$Na_2O \cdot Al_2O_3 \cdot (2.5 \pm 0.5) SiO_2 \cdot n H_2O$$
$(n = 0 \text{ to } 8)$ by crystallizing reaction mixtures containing $Na_2O$, $Al_2O_3$, $SiO_2$ and $H_2O$, distinguished by the fact that precipitation and crystallization of the aluminosilicate gels are carried out at temperatures in the range of about 60° C to 105° C, preferably at temperatures in the range of about 80° C to 100° C, in the presence of about 1 to 20% by weight, preferably about 3 to 10% by weight, of zeolite A.

The molar oxidic ratios (not counting the zeolite A added) of the reactants in the synthesis mixture lie within the following approximate limits:

$SiO_2/Al_2O_3 = 3.0$ to $5.0$ $Na_2O/SiO_2 = 1.2$ to $1.5$ $H_2O/Na_2O = 35$ to $45$

The process according to the invention enables faujasite to be hydrothermally crystallized without any preliminary reaction immediately after hot precipitation of the gels, even with mechanical stirring, and thus shortens the total synthesis time to between 2 and 6 hours. To carry out the process according to the invention, the necessary quantity of soda lye and a small quantity of finely divided zeolite A powder are added to a sodium silicate solution, followed by heating while stirring to a temperature in the range of about 80° to 100° C. A sodium aluminate solution is stirred into this hot reaction mixture. The sodium aluminate solution can either be at room temperature or at the temperature of the sodium silicate solution initially introduced. The cream-like gel precipitated is crystallized with stirring over a period of about 2 to 6 hours at the precipitation temperature.

Surprisingly, this process gives X-ray photographically pure zeolite of faujasite structure when at least about 3% by weight of finely divided zeolite A powder are added to the hot mixture of commercial-grade waterglass and soda lye, and the sodium aluminosilicate gel subsequently precipitated with a sodium aluminate solution (the quantity of the zeolite A powder in % by weight is based on the solids content of the reaction mixture).

It is preferred to use a zeolite A powder in which the proportion of particles with a radius $r$ of less than 1 micron (fine fraction) amounts to more than about 30% of the total number of particles ("finely divided zeolite A"). A zeolite A powder with a fine fraction of less than about 30% does not have any seeding effect ("coarse zeolite A"). The addition of a coarse zeolite A powder of this kind during the reaction results solely in the formation of phillipsite.

The normal and obvious use of seed crystals with the same crystal structure as the molecular sieve to be produced, as proposed in German Patent Specification No. 1,291,325, involves particular complications in the synthesis of faujasite because the seed material first has to be prepared by a special process to prevent the seed crystals from being contaminated by crystalline aluminosilicates with a structure other than the required structure.

According to the invention, this disadvantage of the seed material with faujasite structure does not arise with zeolite A. The zeolite A used for seeding does not have to be prepared in a special process and possible impurities are not detrimental to the seeding effect. The only requirement which the zeolite A has to satisfy is that it should contain a certain quantity of fine-grained particles.

A quantity of zeolite A powder as small as about 1% by weight, when added to the hot waterglass solution, influences the reaction in such a way that faujasite is formed as the main constituent. In cases where hot precipitation is carried out in the absence of seed of zeolite A, phillipsite only is obtained. Even 3% by weight of finely divided zeolite A powder is sufficient for the complete formation of the faujasite-type zeolite.

The addition of finely divided zeolite A powder as seed material also enables the hot-precipitated gels to be stirred during crystallization. Stirring of the reaction mixtures produces 83% crystallinity after only about 1.5 hours at a crystallization temperature of 100° C. Crystallization is complete after about 2.5 hours.

It is also possible, by seeding synthesis mixtures for faujasite-type zeolites with finely divided zeolite A powder, to crystallize reaction mixtures with molar ratios of $SiO_2/Al_2O_3$ and $Na_2O/SiO_2$ at which undesirable, crystalline aluminosilicates would otherwise readily be formed, to form X-ray photographically pure faujasite.

Gel precipitation and crystallization of reaction mixtures seeded with finely divided zeolite A powder may also be carried out at temperatures below 100° C.

Syntheses carried out at 80° C only require a correspondingly longer reaction time, but like syntheses carried out at 100° C yield an X-ray photographically pure faujasite.

The process according to the invention is illustrated in the following Examples:

The following solutions were used as starting materials for Examples 1 to 6:
A. Commercial-grade waterglass, (1.77 moles of $Na_2O$ + 5.98 moles of $SiO_2$)/1 l, Density 1.35.
B. Sodium aluminate solution, (3.4 moles of $Na_2O$ + 2.0 moles of $Al_2O_3$)/1 l, Density 1.36.
C. 45% soda lye, 8.3 moles of $Na_2O$/1 l, Density 1.48.

EXAMPLE 1

This Example demonstrates the influence of the quantity of seed crystals upon the synthesis according to the invention:

Table 1:

| Mixture No. | Zeolite A quantity % by weight | $H_2O$-adsorption capacity g $H_2O$/100 g zeolite 20°C, 10 mm Hg |
|---|---|---|
| 1 | 0.5 | 15.2 |
| 2 | 1.0 | 21.1 |
| 3 | 2.0 | 23.3 |
| 4 | 3.0 | 30.5 |
| 5 | 15.0 | 29.5 |

Table 1:-continued

| Mixture No. | Zeolite A quantity % by weight | H₂O-adsorption capacity g H₂O/100 g zeolite 20°C, 10 mm Hg |
|---|---|---|
| 6[a] | — | 10.1 | a) = mixture for control without Zeolite A.

50.8 ml of soda lye (solution C), 419 ml of $H_2O$ and 3 % by weight of finely divided zeolite A powder, corresponding to Mixture 4 in Table 1, were added to 125 ml of waterglass (solution A), followed by heating with stirring to 100° C. 75 ml of sodium aluminate solution (solution B) were then run in. The sodium aluminosilicate gel precipitated (molar ratios in the mixture as a whole, not counting the added zeolite A: $SiO_2O_3 = 5$; $Na_2O/SiO_2 = 1.2$ and $H_2O/Na_2O = 40$) was completely crystallized over a period of 6 hours with constant mechanical agitation at a temperature of 100° C.

The resulting crystal sludge was separated off from the mother liquor by filtration under suction and washed with distilled water until the washing water had a pH-value of from 10 to 11. After drying at 100° C, followed by activation, the reaction product had a water adsorption capacity of 30.5 g of $H_2O/100$ g of zeolite (20° C/10 mm Hg.).

An X-ray photograph revealed a pure faujasite structure contaminated by very small quantities of phillipsite.

Table 1 shows that even 1% by weight of zeolite A powder as seeding material is sufficient to displace synthesis in the direction of the required faujasite.

COMPARISON EXAMPLE A

The following test was carried out as an example of the need for finely divided zeolite A powder:

250 ml of waterglass (solution A), 840 ml of $H_2O$, 101.6 ml of NaOH (solution C) and 7 g of coarse zeolite A powder were heated together to 100° C with stirring. The gel was precipitated with 150 ml of sodium aluminate solution, the solids component having the following molar composition: $6.0 Na_2O . Al_2O_3 . 5 SiO_2$. The molar ratio of $H_2O$ to $Na_2O$ amounted to 40. The mixture was crystallized over a period of 6 hours at 100° C. The crystals were separated off from the mother liquor and identified as phillipsite from an X-ray photograph.

This Example demonstrates the need for finely divided zeolite A powder as seed material for the production of faujasites from hot-precipitated gels.

EXAMPLE 2

In this Example, the synthesis according to the invention is carried out with different oxide ratios:

117 ml of waterglass (solution A) were stirred with 48 ml of NaOH (solution C), 483ml of $H_2O$ and 3.5 g of finely divided zeolite A powder, followed by heating with continuous stirring to the precipitation temperature of 100° C. 100 ml of sodium aluminate solution were then added to precipitate the gel. The cream-like aluminosilicate gel had the following solids composition: $4.7 Na_2O . Al_2O_3 . 3.5 SiO_2$, while the molar ratio of $H_2O$ to $Na_2O$ amounted to 42.5. The gel was crystallized over a period of 4 hours at a temperature of 100° C with constant mechanical agitation. After crystallization, the solids were separated off from the mother liquor by filtration under suction and were washed with distilled water until the washing water running off had a pH-value of about 10. The solid was dried at 100° C. The product had an adsorption capacity of 31.1 g of $H_2O/100$ g of zeolite (at 20° C/10 mm Hg), pure faujasite being identified from an X-ray photograph.

EXAMPLE 3

The following test was carried out in order to determine the minimum crystallization time:

21 g of finely divided zeolite A powder were stirred into 750 ml of waterglass (solution A), 306 ml of NaOH (solution C) and 2520 ml of $H_2O$. After the mixture had been heated to 100° C, 450 ml of sodium aluminate solution (solution B) were added with continuous stirring.

The cream-like aluminosilicate gel, precipitated with the solids composition $6.0 Na_2O . Al_2O_3 . 5 SiO_2$ and a molar ratio of $Na_2O$ to $H_2O$ of 40 was subsequently crystallized while stirring at 100° C. In order to follow crystallization, samples of the reaction mixture were taken at the time intervals indicated in Table 2 and were worked up in the same way as in the preceding Examples. The adsorption capacity of the powder was then determined at 20° C/10 mm Hg.

Table 2:

| Conversion (%) | Crystallization time (minutes) | H₂O-adsorption capacity g H₂O/100 g zeolite |
|---|---|---|
| 9.5 | 30 | 3.0 |
| 39.0 | 60 | 12.3 |
| 83.0 | 90 | 26.1 |
| 98.5 | 120 | 30.9 |
| 100.0 | 210 | 31.4 |

Table 2 shows that a conversion of almost 99% is obtained after only 2 hours' crystallization at 100° C, crystallization being complete after 3.5 hours.

The zeolite obtained on completion of crystallization is X-ray photographically pure faujasite.

EXAMPLE 4

The following test was carried out as an example of synthesis at a relatively low temperature:

400 ml of waterglass (solution A), 98 ml of NaOH (solution C), 1252 ml of $H_2O$ and 18.6 g of finely divided zeolite A powder were stirred together and the mixture was heated to 80° C. 400 ml of sodium aluminate solution (solution B) were run into this mixture. The gel, precipitated with the following solids composition:

$3.6 Na_2O . Al_2O_3 . 3.0 SiO_2$, and with a molar ratio of $H_2O$ to $Na_2O$ of 40, is stirred for 4 hours at 80° C to complete crystallization of the zeolite.

On completion of crystallization, the solid was separated off from the mother liquor by filtration under suction and washed with distilled water until the washing water running off had a pH-value of about 10.0. The powder was dried at approximately 105° C.

The X-ray photographically pure faujasite had an adsorption capacity of 30.4 g of $H_2O/100$ g of zeolite (20° C/10 mm Hg).

COMPARISON EXAMPLE B

The following test was carried out as an example of the ineffectiveness of zeolite X powder as a seed material: A mixture of 99.6 ml of waterglass (solution A), NaOH (solution C), 364 ml of $H_2O$ and 3.4 of finely divided zeolite X powder was heated with stirring to the precipitation temperature of 100° C, and the aluminosilicate gel was precipitated with 75 ml of sodium aluminate (solution B). The gel with the following solids composition:

5.2 Na$_2$O . Al$_2$O$_3$ . 4.0 SiO$_2$, and with a molar ratio of H$_2$O to Na$_2$O of 40, was crystallized with stirring over a period of 6 hours at 100° C.

On completion of crystallization, the solids were separated off from the mother liquor by filtration under suction and were washed with distilled water until the washing water running off had a pH-value of about 9 to 10. The powder was then dried at 100° C.

The adsorption capacity of 15.3 g of H$_2$O/100 g of zeolite at 20° C/10 mm Hg showed that the zeolite formed did not have faujasite structure.

Phillipsite, together with small quantities of faujasite, was identified from X-ray diffractograms.

In Examples 1 to 4 hereinabove about 30% of the total number of added zeolite A particles had a radius of 1 micron or less as determined by Andreasen. In Comparison Example A substantially none of the zeolite A particles were 1 micron in radius or smaller, most of the particles ranging in radius from about 2 to 5 micron.

The novel features discussed hereinabove can be used, if desired, in conjunction with the features of U.S. Pat. No. 3,685,963, issued Aug. 22, 1972, application Ser. No. 141,976, filed May 10, 1971, now pending, and/or application Ser. No. 318,960, filed Dec. 27, 1972, now abandoned, the disclosures of which are incorporated herein by reference.

It will be appreciated that the instant specification and examples are set forth by way of illustration and not limitation, and that various modifications and changes may be made without departing from the spirit and scope of the present invention.

What is claimed is:

1. A process for the production of synthetic zeolite with the crystal structure of faujasite and with a composition corresponding to the formula Na$_2$O . Al$_2$O$_3$ . (2.5 ± 0.5) SiO$_2$ . n H$_2$O ($n$ = 0 to 8)

comprising forming a reaction mixture containing Na$_2$O, Al$_2$O$_3$, SiO$_2$ and H$_2$O at a temperature of about 60° to 105° C in the presence of about 1 to 20% of finely divided zeolite A based on the weight of Na$_2$O + Al$_2$O$_3$ + SiO$_2$, the molar proportions of the oxides in the reaction mixture being sufficient to form a precipitate which can crystallize to form synthetic zeolite of faujasite structure, and permitting said precipitate to crystallize to essentially pure faujasite.

2. A process as claimed in claim 1, wherein the molar ratios of the oxides in the reaction mixture, exclusive of the added zeolite A, are about:

SiO$_2$/Al$_2$O$_3$ = 3 to 5

Na$_2$O/SiO$_2$ = 1.2 to 1.5

H$_2$O/Na$_2$O = 35 to 45.

3. A process as claimed in claim 1, wherein crystallization is effected with stirring of the reaction mixture containing the precipitate over a period of about 0.5 to 10 hours.

4. A process as claimed in claim 1, wherein more than about 30% of the total number of particles of added zeolite A have a radius of less than about 1 micron.

5. A process as claimed in claim 4, wherein precipitation and crystallization are effected in the presence of about 3 to 10% by weight of added zeolite A at a temperature of about 80° to 100° C with stirring of the reaction mixture containing the precipitate over a period of about 2 to 6 hours, and the molar ratios of the oxides in the reaction mixture, exclusive of the added zeolite A, are about SiO$_2$/Al$_2$O$_3$ = 3 to 5

Na$_2$O/SiO$_2$ = 1.2 to 1.5

H$_2$O/Na$_2$O = 35 to 45.

* * * * *